United States Patent [19]

Marzocchi et al.

[11] 3,967,037

[45] June 29, 1976

[54] FRICTION MATERIAL FOR BRAKE LININGS AND THE LIKE

[75] Inventors: Alfred Marzocchi; Albert E. Jannarelli, both of Cumberland, R.I.; David W. Garrett, Newark, Ohio

[73] Assignee: Owens-Corning Fiberglas Corporation, Toledo, Ohio

[22] Filed: Apr. 12, 1974

[21] Appl. No.: 460,628

[52] U.S. Cl............................ 428/392; 188/215; 192/107 M; 260/38; 260/39 R; 428/375
[51] Int. Cl.² .................. B32B 5/16; F16D 13/60
[58] Field of Search ............ 161/93, 170, 175, 205, 161/DIG. 4, 220; 188/251 A, 259; 192/107 M; 106/36; 156/180, 276; 264/257, DIG. 53; 428/392, 275; 260/38, 39; 252/13

[56] References Cited
UNITED STATES PATENTS

| | | | |
|---|---|---|---|
| 2,845,378 | 7/1958 | Dereich | 161/205 |
| 3,068,131 | 12/1962 | Morton | 192/107 M |
| 3,270,846 | 9/1966 | Arledter et al. | 161/220 |
| 3,429,766 | 2/1969 | Stormfeltz | 161/93 |
| 3,494,884 | 2/1970 | Kraft | 260/39 R |
| 3,520,390 | 7/1970 | Bentz | 192/107 M |
| 3,655,609 | 4/1972 | Evans et al. | 192/107 M |
| 3,743,069 | 7/1973 | Barnett et al. | 192/107 M |
| 3,744,604 | 7/1973 | Austen | 192/107 M |
| 3,756,910 | 9/1973 | Peters et al. | 161/175 |

*Primary Examiner*—William J. Van Balen
*Assistant Examiner*—P. J. Thibodeau
*Attorney, Agent, or Firm*—John W. Overman; Vincent L. Barker, Jr.; Ralph J. Skinkiss

[57] ABSTRACT

Friction compositions of glass fibers bonded with cured organic binders and containing a heat-conducting particulate metal and a binder modifying agent are disclosed. The compositions can optionally contain friction-modifying materials, an elastomer or particulate fillers. The compositions have particular utility as brake or clutch materials and are excellent for automotive application.

9 Claims, No Drawings

FRICTION MATERIAL FOR BRAKE LININGS AND THE LIKE

BACKGROUND OF THE INVENTION

This invention relates to a friction composition comprising a mass or groups of glass fibers uniformly dispersed in a body bonded together by a cured organic binder and also preferably containing a particulate heat-containing material and a binder modifying material. Shaped bodies of such compositions are used as the friction element in brake systems, clutches and other movable devices which employ a friction element. Familiar applications would include brake pads or linings in automotive disc or shoe brake systems and clutch plates.

Friction compositions intended for use in automotive and other vehicles for brake or clutch application must withstand severe operating temperatures and pressures under repeated application without physical failure (disintegration) or deterioration in performance, (brake fade, etc.). The conventional brake lining or pad in use in the automotive industry uses asbestos as the friction material bound in a thermoset resin, and usually contains additional materials such as mineral fillers, metallic powders, antioxidants and friction modifiers. Asbestos linings or pads have been generally satisfactory in the past; however, increasingly severe operating standards due to stricter safety regulations, increased vehicle weight due to safety equipment and options, etc. and higher performance vehicles have made it currently desirable to seek alternative compositions to reduce or eliminate the asbestos content of brake linings in automobiles.

Because of the physical strength of bodies of glass fibers bonded together with resinous binders, such compositions have been suggested in the prior art for use as reinforcing layers for composite, multiple layer friction materials for clutches, brakes and the like. U.S. Pat. Nos. 2,158,337, 3,365,041, 3,429,766 and 3,520,390 disclose the use of woven glass fabric as a reinforcement for conventional asbestos or metallic brake or clutch linings. In addition, U.S Pat. Nos. 2,554,548 and 2,158,337 suggest the use of glass fibers with conventional brake materials (asbestos) in the brake lining, wherein the glass fibers are used to physically reinforce the composite lining and/or to act as the friction material itself.

Beyond these suggested uses in prior patents, glass fibers have not been widely used in the makeup of friction materials such as brake pads or linings. This may be because the wearing properties and coefficient of friction of glass fibers have been not fully appreciated.

By way of further illustration of the known prior art, typical asbestos-based friction products, although effective and adequate under ordinary service conditions, often exhibit appreciable losses in braking effectiveness and diminished wear life when subjected to the rigors of high energy service conditions. For instance, the commercially available asbestos based brake pads or linings soon expend their effectiveness and begin to fade with a loss of uniform braking friction properties and decrease their resistance to wear when exposed to high pressure and temperature conditions encountered in extreme high energy braking service conditions. Such extreme conditions of temperature and pressure are encountered more often with disc type automotive brakes where the total braking area is usually smaller than in shoe type brakes.*

(*Brakes for automotive vehicles are of two basic types: (1) the internal expanding type in which arcuate shaped brake linings on a pair of non-rotating shoes are forced into engagement with a moving brake drum. (2) Disc type brakes in which a moving disc or rotor is clamped between a pair of opposed pads of friction material. The arcuate linings or the pads are conventionally asbestos based as described while the drum or disc is cast iron or other relatively rigid, heat conductive material.)

Conventional pads for disc brakes and brake linings are composed primarily of asbestos fibers in an organic binder matrix which is usually a thermosetting resin or a mixture of thermosetting resin and a heat stable rubber. Because considerably higher temperatures are generated in disc brakes than in drum brakes, the organically-bound friction materials in the pads are more likely to disintegrate due to the thermal degradation of such binders, resulting in inferior frictional characteristics, promoting fade and resulting in increased wear. The higher temperatures also increase the activity of the binder with other materials, for example the disc iron, to form liquid or other low friction materials. Thus, the wear on both the pads and rotor or disc is accelerated at high temperature operation. This high temperature failure is believed to be due to depolymerization or thermal decomposition of the binder itself, which, in addition to the deleterious effects described above, causes the friction material iself (asbestos and possibly other particulate additives) to become loose and thus move under the high pressure of applied brakes, causing deformation of the pad itself. The result is an accelerated wear rate, possible adhesion of the pad to the disc surface, and generally decreased coefficient of friction which appears to the user as brake fade.

While disc type brakes place more severe operating temperatures and pressures on the friction materials than do shoe brakes, they are generally more efficient and are being used with increasing frequency by the automotive industry. Therefore, the need for friction materials capable of good performance at such temperatures and pressures which is economically attractive has increased, particularly in view of increasingly rigid safety and endurance requirements now being faced by the industry.

SUMMARY OF THE INVENTION

The present invention is a new friction material for use in brake pads, brake shoes, clutch facings and the like, which comprises glass fibers bonded together in a mass by a cured organic binder and a binder modifying agent. The material will preferably contain particles of a heat conductive metal and may also contain certain friction modifying additives, an elastomer and one or more particulate fillers. The invention is based upon the discovery that an excellent friction material for high temperature, high pressure brake use can be produced by forming such pads from groups of relatively short glass fibers bonded together with a cured organic binder and containing a binder modifying compound. The modifier increases the temperature at which the friction material becomes ineffective, as seen below. The heat conductive metallic particles serve to reduce the surface contact temperatures while the other ingredients may be present to control or effect certain desirable characteristics to the brake material.

It is therefore a primary object of this invention to provide an improved friction material in which glass fibers comprise the active friction ingredient.

It is a more specific object of this invention to provide an improved friction material for use in brakes having good frictional and endurance characteristics at operating temperatures up to and above 1000°F.

Another more specific object of this invention is to provide a friction material suitable for use in brake linings or pads comprising from 30 to 60 percent by weight of randomly orientated glass fibers, from 12 to 20 percent by weight of a resinous binder selected from the group consisting of a thermoset phenolic resin and aniline-formaldehyde resin, from 2 to 8 percent by weight of a binder-modifying material selected from the group consisting of the carbonates and hydroxides of calcium, barium and aluminum, tetralkyl silicates and alkyl siloxanes wherein the alkyl groups, in both cases, have from 1 to 4 carbon atoms, and aromatic silicates and siloxanes having a hydroxy function, from about 5 to 20 percent by weight of a particulate heat conducting material, from about 5 to 15 percent by weight of a particulate filler, and from 5 to 15 percent by weight of a friction-modifying material.

The above objects and advantages will become apparent to those skilled in the art from the following detailed description of preferred embodiments.

Friction materials made in accordance with the instant invention, due to their operability over a wide temperature range, can be incorporated in brake linings, automatic transmissions, clutches and in belt drives wherein the friction material is either used as the flexible under-surface of the belt or on the driving spindle or pulley. While primary reference is made to the use of the friction compositions for use as brake pads in automotive type disc brakes, it is to be understood that the friction compositions described are suitable for use in numerous instances where relatively moving surfaces are in engagement and friction therebetween is desired to absorb energy, either to slow or stop movement or to generate heat for another purpose.

DESCRIPTION OF THE PREFERRED EMBODIMENT

EXAMPLE I

A friction material, having the following composition, given in percentages by weight of the total composition, was prepared as described below:

| | Weight Percent |
|---|---|
| Glass fibers, ⅛ inch chopped strand | 40 |
| Phenolic resin (see below) | 15 |
| Elastomer | 3 |
| Barytes | 8 |
| Copper chips | 10 |
| Cuprous oxide | 6 |
| Graphite | 4 |
| PbS | 6 |
| $Sb_2S_3$ | 4 |
| Tetraethylorthosilicate | 4 |

EXAMPLE II

A second friction material, having the following composition, given in percentages by weight of the total composition, was prepared as described below:

| | Weight Percent |
|---|---|
| Glass fibers, ⅛ inch chopped strand | 40 |
| Phenolic resin (see below) | 15 |
| Elastomer | 4 |
| Rutile ($TiO_2$) | 15 |
| Copper powder | 7 |
| Graphite | 4 |
| PbS | 10 |
| $Ca(OH)_2$ | 5 |

EXAMPLE III

A third friction material, having the following composition, given in percentages by weight of the total composition, was prepared as described below:

| | Weight Percent |
|---|---|
| Glass Fibers, ⅛ inch chopped strand | 35 |
| Phenolic-urea resin (see below) | 12 |
| Elastomer | 7 |
| Rutile | 15 |
| Water | 3 |
| Copper chips | 10 |
| Graphite | 3 |
| Gypsum | 7.5 |
| Portland Cement | 7.5 |

The compositions of Examples I and II above were wet-mixed by blending the ingredients together and adding about 10 percent by weight methyl ethyl ketone. The wet mixes were dried at about 150°F., the drying temperature being dependent upon the time required to give the desired flow of the mixture for the sample molding procedure described below.

The compositions were placed in a brake pad mold heated to 350°F., and pressed at an applied pressure of about 4000 psi. The brake pads produced were post-cured by heating at 350°F. to 400°F. for 15 hours. The resulting pads* had a density of about 2 g/cc.

(*The brake pads in this instance were conventionally shaped disc brake pads about 1 cm thick with a total friction surface area of about 50 cm².)

It is desirable that air pocket formation be eliminated or minimized in producing brake pads. Because of the relatively high density of metal, the density of the post-cured brake pads is to a large extent dependent upon the amount of metal present in the composition. The density of the brake pads can range from about 1.6 to 2.5 g/cc.

In the formulation of Examples I and III the cured organic binder material was a high temperature phenolic resin, available from several sources including Minnesota Mining and Manufacturing Co., as NX 3854 or 3853, Ashland Chemical Co., as 8835, and Hercules Incorporated as HX 53. However, any phenolic resin of the type employed in the manufacture of friction elements can be used according to the present invention. An example of such a resin is one prepared by condensing formaldehyde and phenol (hydroxy benzene) in a mole ratio of about 1:1, using formic acid as a condensing agent. The condensation is continued until the condensation product is a reversible fusible thermoplastic material, which is water insoluble. The condensate is then separated from the aqueous phase, comminuted, and blended with hexamethylenetetraamine in an amount sufficient to provide about one half mole of formaldehyde per mole of phenol in the condensate. However, phenol/aldehyde resins obtained from cresol, xylenol or other alkyl or aralkyl substituted phenols, resorcinol or a furfuryl alcohol as all or part of the phenol, and furfuraldehyde as all or part of the aldehyde can be employed.

One typical thermosetting resins curable to an insoluble and infusible thermoset state are generally suitable as a binder component, including, for example, phenol formaldehyde, phenol furfural, aniline-based resins such as aniline formaldehyde, and phenol-aminoplast-formaldehyde resins wherein the aminoplast can be melamine, dicyandiamide, urea or thiourea.

The tetraethylorthosilicate used in Example I improves the high-temperature resistance of the composition. Although the mechanism whereby this occurs has not been determined, it is theorized that the presence of the orthosilicate in the cured organic binder matrix helps to impart to the organic binder the high-temperature stability characteristic of an inorganic binder matrix. Tetraalkyl silicates and siloxanes where the alkyl group has from 1 to 4 carbon atoms and aromatic silicates and siloxanes having a hydroxy function, are useful in the described invention.

As disclosed in Examples II and III, the inclusion of calcium hydroxide or Portland Cement to provide calcium cations imparted a similar improvement in high-temperature resistance of the cured organic binder. Other metal cations of Group II function in a similar manner. For example, compounds such as $CaCO_3$, $Ba(OH)_2$, $BaCO_3$, $Al(OH)_3$ can be used to provide the desired metal cation.

The glass fibers which makes up the active friction element and which may constitute from 30 to 60 percent by weight of the cured friction composition, are thoroughly dispersed through the composition. Because of the strength, hardness and stiffness of glass fibers, the composition appears to be relatively porous and yet has compression or resilient characteristics comparable to or better than an asbestos-containing friction material. Because of differences in hardness and softening points available in commerically fiberizable glass compositions, a range of friction compositions having varying coefficients of friction is possible. Many types of glass fibers are suitable for inclusion as the friction element including chopped strand of the examples above, chopped wool or treated fibers of the type described in commonly-owned pending U.S. application Ser. No. 408,704, filed Oct. 23, 1973 and now abandoned. The selection of a particular type of glass fiber does not constitute a part of this invention.

An important function of the glass fibers, in addition to acting as the active friction agent and as a physical reinforcement for the pad itself, is to assist in conducting heat away from the friction surface. In some cases, the inclusion of groups of longer fibers orientated at an angle to the braking surface may be helpful in removing heat, as more fully set forth in commonly owned U.S. application Ser. No. 282,883, filed Aug. 21, 1972 and now abandoned. In lieu of or in addition to such oriented fibers, thorough and uniform dispersion of short length, randomly orientated fibers, such as the ⅛ inch chopped fibers used in Examples I and II above, is helpful in promoting heat transfer away from the friction surface by eliminating hot spots and assuring a uniform coefficient of friction across the friction surface. Uniform dispersion of such short fibers throughout the matrix material prior to pressing and curing is dependent primarily upon mixing time and the types of fibers being utilized. While both wet and dry mixing processes can be utilized to formulate the compositions shown above, it has been found that wet mixing seems to be preferable in promoting uniform dispersions for the ⅛ inch chopped strand used therein.

Brake pads made more compositions conforming to the formulae of Examples I and II above were tested on a laboratory friction test machine capable of measuring performances of friction materials at temperatures up to 1000°F. This machine, known as a CHASE machine,* is capable of mor severe testing than other bench-type laboratory machines and is designed to perform repetitive cycle tests of a material to ascertain recovery from fade, as well as continuous drag testing over a given time interval, such as 15 minutes. Brake pads of a composition of Examples I and II satisfactorily performed both continuous endurance and cycle tests in a CHASE machine standard test program.

(*The CHASE machine and its test procedures are described in SAE Report 670510, May, 1967.)

It is believed that the excellent performance of Example I, II and III materials is due, at least in part, to the inclusion of the tetraethylorthosilicate or a calcium-containing compound which improves the high temperature characteristics of the organic binder system, as explained above.

In addition to improvements in binder performance, it is believed that the excellent performance of Examples I and II may be due in part to the ability of the material to conduct heat away from the friction surface—to the interior of the pad and its metal holder or shoe which acts as a heat sink. The metal ingredient can be added in the form of powder or as a flake-type material. For example, metal flakes approximately ⅛ or ¼ inch in length and 1 to 2 mils in thickness are suitable. Metal powder in the range of 25 mesh to 70 mesh is also suitable. Chips or powdered metal elements can be used for this purpose. Other conductive elements can be used so long as their physical and chemical properties do not adversely affect other braking requirements. In place of the copper chips or powder of these Examples I and II, other metals such as brass, iron, molybdenum or aluminum could be used to facilitate heat transfer away from the face of the pad. As pointed out above, the glass fibers themselves, random or oriented, also assist such metallic ingredients in the conduction of heat away from the braking surface of the pad.

As is known to those skilled in the art, minor additions of certain elements to a brake or friction material are made to promote or suppress certain operational characteristics. For example, minor amounts of graphite may be added to decrease cold coefficient of friction to avoid "harshness" in a brake material; elastomers such as rubber are commonly used to prevent brake squeal and to provide some coefficient of friction at low temperatures; copper oxide, lead sulfide and antimony tri-sulfide are believed to modify harshness and to add durability and reduce rotor or drum wear.

The composition can contain up to about 5 percent by weight of any elastomer, and up to about 15 percent by weight of a particulate filler. An elastomer particularly suitable for use in the instant invention is sold under the trade designation Hycar Rubber 1411. The barytes is present as an inorganic filler material. Other particulate fillers such as zirconium silicate, clay, carborundum, and metal oxides such as aluminum oxide, silica, $ZrO_2$ and $TiO_2$ (rutile) may be used. Other known brake additives can be used, such as those disclosed in U.S. Pat. No. 3,684,062.

What we claim is:

1. A friction material suitable for use in brake linings or pads, comprising from 30 to 60 percent by weight of randomly orientated glass fibers, from about 12 to 20 percent by weight of a resinous binder selected from the group consisting of a thermoset phenolic resin and aniline-formaldehyde resin, from about 2 to 8 percent by weight of a binder-modifying material selected from the group consisting of the carbonates and hydroxides of calcium, barium and aluminum, tetralkyl silicates and alkyl siloxanes wherein the alkyl groups, in both cases, have from 1 to 4 carbon atoms, and aromatic silicates and siloxanes having a hydroxy function, from about 5 to 20 percent by weight of a particulate heat-conducting material, from about 2 to 5 percent by weight of an elastomer, from about 5 to 15 percent by weight of a particulate filler, and from 5 to 15 percent by weight of a friction-modifying material.

2. A friction material as claimed in claim 1 wherein the particulate heat-conducting material is a metal selected from the group consisting of iron, brass, copper, aluminum and molybdenum.

3. A friction material as claimed in claim 1 wherein the particulate heat-conducting material is a metal oxide selected from the group consisting of silica, alumina and rutile.

4. A friction material as claimed in claim 1 wherein the particulate filler is selected from the group consisting of barytes, clay, carborundum and zirconium silicate.

5. A friction material as claimed in claim 1 wherein the glass fibers are ⅛ inch mean length chopped fibers.

6. A friction material as claimed in claim 1 wherein said glass fibers comprise about 40 percent by weight and said particulate heat-conducting material comprises about 7 to 10 percent by weight of copper.

7. A friction material as claimed in claim 6 wherein said binder-modifier comprises about 4 percent by weight of tetraethylorthosilicate.

8. A friction material as claimed in claim 6 wherein said binder-modifier comprises about 5 percent by weight of calcium hydroxide.

9. A friction member for use in a brake or clutch assembly comprising a molded shaped body, said body including from 30 to 60 percent by weight of randomly orientated glass fibers, from about 12 to 20 percent by weight of a resinous binder selected from the group consisting of a thermoset phenolic resin and aniline-formaldehyde resin, from 2 to 8 percent by weight of a binder-modifying material selected from the group consisting of the carbonates and hydroxides of calcium, barium and aluminum, tetralkyl silicates and alkyl siloxanes wherein the alkyl groups, in both cases, have from 1 to 4 carbon atoms, and aromatic silicates and siloxanes having a hydroxy function, from about 5 to 15 percent by weight of a particulate, heat-conducting material, from about 2 to 5 percent by weight of an elastomer and from about 5 to 15 percent by weight of a friction-modifying material.

* * * * *